United States Patent

Buerger

[15] 3,676,919
[45] July 18, 1972

[54] PROCESS FOR MAKING A WHEEL TRIM LOCK RING ASSEMBLY

[72] Inventor: Herbert Buerger, Walton, N.Y. 13856
[22] Filed: May 11, 1970
[21] Appl. No.: 36,336

[52] U.S. Cl. ..................................29/469, 301/37, 29/432.2
[51] Int. Cl. ..........................................................B23p 21/00
[58] Field of Search .....................29/469, 432.2, 469, 432.2; 301/37

[56] References Cited

UNITED STATES PATENTS 3,505,724  4/1970  Leitner....................................29/469

Primary Examiner—John F. Campbell
Assistant Examiner—D. P. Rooney
Attorney—J. B. Felshin

[57] ABSTRACT

The lock ring is snapped into locking engagement with a wheel cover or other wheel trim. Mastic sealer material is applied to the snap in connection between the wheel and trim. Once the two pieces are locked together they can only be taken out with considerable difficulty. The sealer material is for the purpose of quieting squeaking and preventing relative rotation between the two pieces.

5 Claims, 3 Drawing Figures

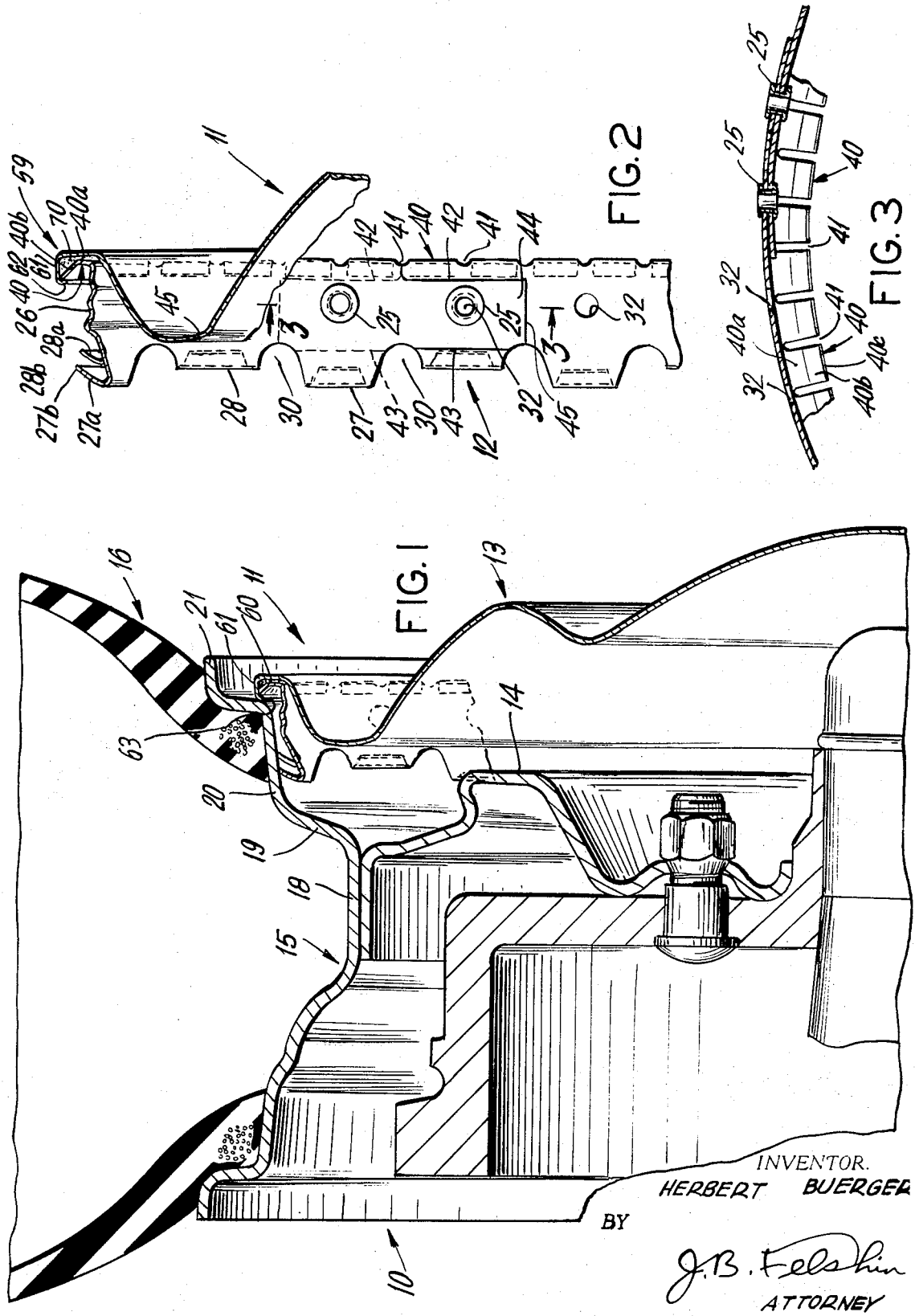

PROCESS FOR MAKING A WHEEL TRIM LOCK RING ASSEMBLY

This invention relates to vehicle wheel trims and lock rings assembled therewith and having means for engaging wheel tire rims.

Heretofore, such assemblies comprised a wheel trim having an annular rolled edge tightly crimped or clamped around an annular edge of a lock ring. Such construction necessitated shipping the trim and lock ring in assembled condition. When so assembled they cannot be packed compactly for shipping, and the plating must be accomplished prior to shipping.

One object of this invention is to provide a construction of the character described in which the wheel trim and lock ring may be shipped unassembled and readily assembled by the customer. Such construction permits compact shipment, thereby reducing shipping costs, and permits plating by the customer. The lock rings may be shipped flat or in ring form. When shipped flat, in proper lengths, the lock ring may be formed into a ring and the ends eyeleted by means of a simple fixture. In some foreign countries the importer must supply a certain percentage of the manufacture of the final product. With the present construction, forming of the rings from flat pieces, plating, and assembly of the wheel trim with the lock ring by the customer or importer provides the required amount of manufacturing costs to satisfy the laws of the country to which these parts are shipped.

Another object of this invention is to provide an assembly of the character described comprising a wheel trim and a lock ring that may be assembled with said wheel trim by snapping an annular portion of the lock ring, which comprises spring teeth, into engagement with an annular flange of the wheel trim and without crimping, clamping, or rolling a bead on the wheel trim to said teeth.

Still another object of this invention is to provide in an assembly of the character described, a lock ring which may be placed on an assembly fixture which holds the wheel trim upside down in a circular ring, said trim and lock ring being so constructed that when the lock ring is pushed down into an over shaped bead of the trim, the lock ring and trim will be snapped together and tightly assembled. The lock ring has a circle of spring teeth on a diameter larger than the diameter of the annular edge on the trim which the teeth engage, and hence the lock ring has to be forced down to force the edges of the spring teeth to bend or flex inwardly and jump over the inner annular edge of the edge on the trim and then expand to engage the trim, thus locking the ring to the trim.

Yet another object of this invention is to provide an assembly of the character described in which mastic sealing material is inserted at the locking point between the ring and trim to quiet metallic noises and help prevent rotation between the ring and trim.

A further object of this invention is to provide a strong, rugged and durable assembly of the character described which shall be relatively inexpensive to manufacture, easy to assembly and yet practical and efficient to a high degree in use.

Other objects of this invention will in part by obvious and in part hereinafter pointed out.

The invention accordingly consists in the features of construction, combinations of elements, and arrangement of parts which will be exemplified in the construction hereinafter described and of which the scope of invention will be indicated in the following claims.

In the drawings:

FIG. 1 is a partial, axial, cross-sectional view of a wheel assembled with a lock ring and wheel trim, embodying the invention;

FIG. 2 is a partial, cross-sectional view of the lock ring assembled with a wheel trim;

FIG. 3 is a partial cross-sectional view taken on line 3—3 of FIG. 2.

Referring now in detail to the drawing, 10 designates a vehicle wheel and 11 designates a lock ring and wheel trim assembly embodying the invention. The assembly 11 comprises a lock ring 12 assembled with a wheel trim 13, here shown in the form of a wheel cover. The wheel trim may also be in the form of a wheel ring if desired.

The vehicle wheel 10 may be of usual construction and comprises a usual steel hub 14 to which is welded a steel rim 15 supporting a tire 16. The steel rim 15 is also of well known construction and comprises a radially inner web 18 from the outer side of which extends a radially and axially outwardly inclined annular portion 19. Extending axially outwardly from the outer end of portion 19 is an annular portion 20 formed with an outer flange 21. The tire 16 contacts portions 20, 21 as shown in FIG. 1 of the drawing. Portion 20 is slightly inclined radially and axially outwardly to form an annular portion of sloping shape.

The lock ring 12 is made from a straight band, rolled into circular shape and eyeleted together at its overlapping ends by eyelets 25. Said ring 12 has a central annular portion 26 which is transversely corrugated. Extending axially inwardly from the central corrugated portion 26 are alternating longer and shorter springs 27, 28 with notches 30 therebetween. The outer ends of springs 27, 28 are bent back radially and axially outwardly to form spring fingers 27a, 28a, respectively, having outer end edges 27b, 28b, respectively, to engage the inner surface of portion 20 of the wheel rim 15 to attach the lock ring 12 to the wheel rim.

The central corrugated portion 26 of the lock ring 12 is formed with equally spaced holes 32. The band from which the lock ring is made, is of such length that its outer ends can be overlapped with two holes at one end registering with two holes at the other end. Eyelets 25 passing through the two pair of registering holes, hold the band in circular shape and in the diameter desired.

The band at its radially outer side is formed with outwardly radiating teeth 40 separated by narrow notches 41. Each tooth 40 comprises a radially outwardly extending portion 40a from which a resilient, flexible flange 40b is inclined radially, outwardly and axially inwardly. The openings 32 are aligned with every other notch 41, angularly. The springs 27, 28 are aligned with the holes 32, angularly. At each end of the band, the last two teeth 40 are cut off at edges 42, on one side, and the last springs 27 or 28 are cut off to form edge 43 forming end tabs 44 having end edges 45.

The wheel trim 11 has at its outer periphery, a bead 59 comprising an annular radially outwardly extending wall or portion 60 from which a cylindrical wall 61 extends axially inwardly and terminating in a radially inwardly extending annular flange 62, spaced from wall 60. The normal diameter of the circle of outer edges 40c of teeth 40 is somewhat greater than the diameter of the circular edge 63 of flange 62. Hence, to assemble the lock ring 12 with the cover 11, the lock ring has to be axially aligned with the cover and pushed toward the cover to cause the inclined portions 40b of the teeth 40 to flex radially inwardly to by-pass edge 63 and snap past said edge and expand into engagement with the inner surface of cylindrical flange or wall 61 adjacent the inner surface of flange 62. This can be accomplished with an assembly fixture which holds the cover upside down in a circular ring. Sealer mastic 70 is then applied to the inner surfaces of the teeth 40. A circular punch is necessary to push the lock ring down into the over shaped bead or flange 62 of the cover. The lock ring is larger in diameter at the circle of outer edges of teeth 40, than the inside diameter of the edge 63 of the flange; and the lock ring has to be forced down with a certain amount of pressure (approximately 100 lbs.) which forces the inclined portions 40b of the square teeth 40, to bend inwardly and jump over the inner edges 63 of the flange of the wheel cover; thus locking the wheel cover in place. Once the two pieces are locked together, they can only be taken apart with considerable difficulty. The sealer is for the purpose of quieting metallic noises or squeaking. The mastic sealer 70 is an adhesive that never cures to a hard brittle state. It remains pliable at normal temperatures.

It will be noted that the space between wall 60 and flange or lip 62 is wider than the unflexed teeth 40. The teeth are not gripped by a bead, as in prior constructions. The inclined teeth 40b merely flex or bend and then snap out into said space. The outer edges of teeth 40 may engage the inner surface of wall 61. The lip 62 is not rolled against the teeth 40 after the assembly. The fact that the space between wall 60 and flange 62 is wider than the teeth 40, permits the teeth to be pushed into said space, during assembly, a sufficient distance to permit the teeth to flex and yet move beyond the edge of flange 62, to clear said flange and snap outwardly. The edge of flange 62 does not contact teeth 40.

The covers 12 can be shipped unplated and packed unassembled to the lock rings. They may thus be compactly nested. The lock rings may be shipped as straight strips or as rings. When shipped as straight strips, they can be formed into circular shape and eyeletted on a simple fixture. The lock rings and covers can be assembled by the customer. By shipping the parts unassembled, the packing is more compact and the shipping costs are greatly reduced. Also by shipping the parts unassembled, the covers can be plated by the customer before assembly with the locking rings.

In some countries such as Mexico and some South American countries, the law provides that the importer or native of that country, must accomplish a certain percentage of the complete manufacture of the imported item in said country. By shipping the lock rings and covers unassembled and/or unplated and/or with the lock rings in strip form, the importer is enabled to do his required share of the manufacture of the completed article.

The covers may be chrome plated by the customer. If assembled lock rings and covers are shipped, they must be plated by the shipper, prior to assembly.

It has been found that four covers and four lock rings, unassembled can be shipped in the space required for one assembled lock ring and cover. The straight strips for making the lock rings may be cadmium plated by the shipper or by the customer.

It will thus be seen that there is provided an article in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawings, is to be interpreted as illustrative only.

What is claimed is:

1. A process of assembling a lock ring member with a wheel trim member, one of said members having a circle of radial resilient teeth, the end edges of which are in a circle, the other member having an annular radial flange formed with an annular edge of such diameter relative to the diameter of the circle of end edges of said teeth, that the end portions of said teeth overlap the end edge portion of said flange when said members are in coaxial relation, said process comprising pressing said members together coaxially and causing the end edge portions of said teeth to engage said annular edge of said flange to flex said end portions of said teeth and to snap past said annular edge and then expand whereby to lock said members together.

2. The process of claim 1 in which the outer end portions of said teeth are inclined to the plane of said annular flange, radially and axially in a direction away from the direction of movement of said teeth toward said flange during assembly.

3. The process of claim 2, wherein the diameter of said circle of end edges of said teeth is greater than the diameter of said annular end edge of said flange.

4. The process of claim 1, and applying mastic material between said teeth and said wheel trim.

5. The process of claim 1, wherein said teeth are on the lock ring member and said flange is on the wheel trim member.

* * * * *